United States Patent [19]

Serenkov et al.

[11] 4,124,468

[45] Nov. 7, 1978

[54] PROCESS FOR THE PRODUCTION OF POLYAMIDES

[76] Inventors: Vasily I. Serenkov, ulitsa Plekhanova, 35, korpus 7, kv. 23; Jury S. Deev, Fergansky proezd, 10, korpus 2, kv. 104; Evgeny A. Ryabov, ulitsa Pervomaiskaya, 43, kv. 31, all of Moscow; Elena V. Gorbunova, Noginsky raion, poselok Obukhovo, ulitsa Lenina, 5, kv. 10; Vladimir S. Tikhomirov, Schelkovo, ulitsa Kooperativnaya, 23, kv. 5, both of Moskovskaya oblast; Marina K. Dobrokhotova, Dubininskaya ulitsa, 6, kv. 93; Alexandr V. Berezovsky, ulitsa Plekhanova, 24, korpus 1, kv. 48, both of Moscow, all of U.S.S.R.

[21] Appl. No.: 638,688

[22] Filed: Dec. 8, 1975

[51] Int. Cl.² .......................... C08F 2/54; C08F 4/00; C08G 69/14
[52] U.S. Cl. ............................. 204/159.11; 260/78 L; 260/78 P
[58] Field of Search ...................... 260/78 L, 78 P; 204/159.11

[56] References Cited

U.S. PATENT DOCUMENTS

| | | | |
|---|---|---|---|
| 2,622,076 | 12/1952 | Koch | 260/78L |
| 3,174,951 | 3/1965 | Taber | 260/78 P |
| 3,321,447 | 5/1967 | Kunde et al. | 260/78 L |
| 3,383,367 | 5/1968 | Black et al. | 260/78 P |
| 3,883,608 | 5/1975 | Herbert | 260/78 L |

FOREIGN PATENT DOCUMENTS 1,148,508 4/1969 United Kingdom.

OTHER PUBLICATIONS

Shein et al., Chemical Abstracts, vol. 62:6639g (1965).
Nagato et al., Chemical Abstracts, vol. 77:35,257f (1972).

*Primary Examiner*—Walter C. Danison
*Attorney, Agent, or Firm*—Haseltine, Lake & Waters

[57] ABSTRACT

A process for the production of polyamides, which comprises polymerizing lactams in the presence of oxides of transition-metals. The process is carried out at a temperature in the range from 200° to 350° C in air or in an inert gaseous medium. Said process may likewise be conducted with the reactants being exposed to an ionizing radiation, e.g. gamma-radiation, which boosts the polymerization rate by 5 or more times. The end product shows good mechanical, electrical and thermophysical properties and is 10 times as wear-resistant as the prior art materials. The process of the invention gives no by-products, wastes or sewage.

20 Claims, No Drawings

PROCESS FOR THE PRODUCTION OF POLYAMIDES

The present invention relates to processes for the production of polyamides.

Polyamides are employed for manufacturing fibers which are used to produce engineering cloths, aircraft and motorcar cords, conveyor belts, filter cloths, fishing nets, bristle and the like.

Polyamides are also excellent antifriction, structural and electrical insulation materials which are employed in mechanical engineering for manufacturing piping, friction components, gear wheels, cog wheels, impact components, as well as components resistant to hydrolysis, cold water and chemicals; they are further employed as insulating materials in electrical and radio engineering as well as in medicine.

What with such a wide range of application of polyamides, they are constantly at a premium, which stresses the need for developing highly efficient processes for the production thereof.

The currently employed industrial process for the production of polyamides by hydrolysis to form lactams in the presence of acid initiators has some disadvantages: the process lasts too long (12 to 16 hours); high pressures are required (up to 30 atm. and higher); the process cannot but be effected in two steps, etc. (French Patent No. 1,411,578; U.S. Pat. No. 3,321,447; Japanese Patent Cl. 26(5)E112(CO8g20/10) No. 49-21,313).

It is likewise known in the art to produce polyamides from lactams by an anionic technique in the presence of alkaline initiators; this process differs from the above-mentioned hydrolytic one by a higher polymerization rate. However, when exposed to high temperatures, the polyamides produced anionically substantially diminish in molecular weight and deteriorate in mechanical properties due to thermodestructive processes catalyzed by the anionic polymerization initiators. For this reason, the anionic process is primarily employed for effecting polymerization right in the molds to produce items of various shape and mass (French Patent Nos. 1,565,240 and 1,499,624; Swiss Patent No. 417,959; Japanese Patent No. 13,754).

It is further known in the art to produce polyamides from lactams (U.K. Patent No. 1,148,508) in a process wherein the initiators are constituted by Lewis acids: $BF_3$, $SnCl_4$, $SiCl_4$, $TiCl_4$, $AlCl_3$, $FeCl_3$ and $CuCl_2$ of which $BF_3$ is a preferred catalyst, particularly in the form $BF_3(C_2H_5)_2O$. However, the polymer produced in the latter process has a low molecular weight engendering poor mechanical properties. In most cases the polymerization is effected in a solvent medium, such as toluene or benzene, which, at reaction temperatures between 190° and 300° C., make it necessary to use autoclaves capable of withstanding pressures around 100 atm, which renders the process extremely risky in terms of fire and explosion hazards. Besides, all Lewis acids react with lactams to release corrosive acids (HCl and HF), calling for the use of corrosion-resistant equipment.

It is an object of the present invention to provide an improved process for the production of polyamides from lactams in the presence of initiators that would enable cutting down the process time and obtaining products distinguished by virtue of high processability and adequate properties.

The foregoing and other objects are attained in a process for the production of polyamides which, in accordance with the invention, comprises polymerizing lactams in the presence of oxides of d-metals i.e. transition metals, accounting for from 0.1 to 50 percent by weight of the reaction mixture at a temperature of from 200° to 350° C. in air or in an inert medium.

Said oxides of 3d-metals allow the process time to be dramatically reduced (by 3 to 10 times as against the hydrolytic technique depending on the type and level of the oxide).

If the initiator level drops below 0.1 percent by weight, the reaction rate is too slow; whereas more than 50 per cent by weight of the initiator adversely affects the mechanical properties of the polymer.

In order to achieve sufficiently high polymerization rates without impairing the mechanical properties of the polymer, the process of the invention is preferably effected at an oxide level of from 5 to 20 percent by weight.

The temperature range specified for the proposed process is explained as follows: 200° C. is a reaction initiation temperature, whereas at temperatures above 350° C. the polymer starts to decompose; for these reasons, the proposed process is carried out at a temperature in the range from 200° to 350° C.

The oxides of d-metals may be $TiO_2$, $V_2O_5$, $Cr_2O_3$, $MnO_2$, $CuO$, $Cu_2O$, $ZnO$ and $Co_2O_3$, $MoO_3$, $WO_3$; but $TiO_2$, $V_2O_5$ and $Cr_2O_3$ are preferred as the most effective ones.

Lactam polymerization in the presence of said oxides may be effected at a residual pressure of from $10^{-1}$ to $10^{-5}$ torr, at atmospheric pressure or at elevated pressure (up to 3 atm.). Where the polymer is discharged from the reactor by means of a screw conveyor, the reduced and atmospheric pressure levels are recommended; whereas where the product is discharged pneumatically, the process is preferably carried out at elevated pressure.

As has been mentioned above, the process may be carried out in an inert medium. The latter may be composed of any gaseous substance inert with respect to the lactams. Although the process is feasible in air, polymerization in an inert medium conduces to better properties of the polymer.

In order to boost the reaction rate, the process of polymerization is preferably effected by exposing the feedstock lactams to an ionizing radiation, viz. gamma-radiation, fast electrons or X-rays. The dose rate lies in the range from 20 to 200,000 rad/sec depending on the type and level of the oxide, the temperature and the type of the medium as well as the type of the radiation emitter. Thus, for instance, for 5 percent by weight of the oxide $TiO_2$ in a medium of nitrogen at a temperature of 300° C., the radiation being gamma-rays, the dose rate is 200 rad/sec.

The proposed process is realized as follows.

The process of the invention is effected in a straightforward manner using known process equipment.

A specified quantity of lactam and said oxide is charged into a mixer wherefrom the prepared mixture is sent to a heater to be heated to a temperature above the lactam melting point but below the reaction temperature; then the melt is supplied to a steel reactor equipped with a stirrer and a heater whereinto inert gas is fed. The polymerization is carried on with continuous stirring. Upon completion of the reaction, the product is extruded out of the reactor in the form of a braid into a bath filled with water wherein the polymer is cooled to be subsequently granulated, dried and packed.

The proposed process for lactam polymerization in the presence of said oxides of d-metals offers the following advantages over the hydrolytic process currently in industrial use:

(a) The proposed process takes less time;

(b) The polymer does not undergo destruction in processing;

(c) The process proceeds in a single step, materially simplifying the flow chart and also permitting a continuous procedure;

(d) no high-pressure equipment is required;

(e) the product is superior in performance to the polymer produced hydrolytically and anionically;

(f) at a higher level of said oxides, viz. above 5 percent by weight, the oxide serves as a filler; thus, the polymer is filled right in the course of polymerization;

(g) the process gives already colored polymers; thus, if the oxide is $TiO_2$ the product is white, while the case of $Cr_2O_3$ the polymer is green;

(h) the polymer shows excellent wear resistance, being superior in this respect by a factor of 5 to the products of the prior art processes;

(i) the process produces no wastes, emissions and other waste products;

(j) owing to the simpler procedures and higher throughput, the proposed process features improved technical and economic characteristics.

As distinct from the product of the prior art anionic technique, the polymer produced in the process of this invention (the polymerization times being compatible) lends itself to all known kinds of processing without any noticeable adverse effect on its molecular weight or mechanical properties.

The present invention will be further understood from the following exemplary embodiments of the proposed process for the polymerization of lactams.

EXAMPLE 1

A steel reactor equipped with a stirrer and a heater is charged with 300 g of dodecalactam and 15 g of titanium dioxide (5 percent by weight).

The reactor is evacuated to a residual pressure of $10^{-3}$ torr. The reaction is carried out at a temperature of 300° C. for 4 hours with continuous stirring, after which the reactor is cooled down, and the polymer is discharged therefrom with the aid of a screw conveyor. The degree of conversion is 98%; the molecular weight is 43,000; and the color of the polymer is white.

EXAMPLE 2

In this example, the reaction is run along the same lines as in Example 1, except that the residual pressure is $10^{-1}$ torr. The degree of conversion is 97.5%; the molecular weight is 41,000; and the color of the polymer is white.

EXAMPLE 3

A steel reactor equipped with a stirrer and a heater is charged with 300 g of dodecalactam and 30 g of titanium dioxide (10 percent by weight). The reactor is closed, and the reaction is carried out in an atmosphere of air for 2 hours with continuous stirring, after which the reactor is cooled down and the polymer product discharged therefrom with the aid of a screw conveyor. The degree of conversion is 99%; the molecular weight is 38,000; and the polymer color is white.

EXAMPLE 4

A steel reactor equipped with a stirrer and a heater is charged with 300 g of caprolactam and 30 g of titanium dioxide (10 percent by weight) and purged with nitrogen, whereupon the reactor is closed and the pressure therein is raised to 3 atm. The reaction is carried on in an atmosphere of nitrogen at a temperature of 300° C. for 7 hours with continuous stirring, after which the reactor is cooled down and the product polymer discharged therefrom at the above-mentioned pressure. The degree of conversion is 94.5%; the molecular weight is 16,000; the melting point is 220° C.; and the color of the polymer is white.

EXAMPLE 5

A steel reactor equipped with a stirrer and a heater is charged with 300 g of dodecalactam and and 60 g of chromium oxide (20 percent by weight), purged with nitrogen and closed. The reaction is carried on at atmospheric pressure in an atmosphere of nitrogen at a temperature of 300° C. for 2.5 hours with continuous stirring. Upon completion of the reaction, the reactor is cooled down and the product polymer discharged therefrom. The degree of conversion is 98.5%; the molecular weight is 33,000; and the color of the polymer is green.

EXAMPLE 6

A steel reactor equipped with a stirrer and a heater is charged with 280 g of dodecalactam and 14 g of titanium dioxide (5 percent by weight), purged with nitrogen and closed. The reaction is carried on at atmospheric pressure in an atmosphere of nitrogen at a temperature of 300° C. for 4 hours with continuous stirring, after which the reactor is cooled down and the product polymer discharged therefrom. The degree of conversion is 98%; the molecular weight is 40,000; and the color of the polymer is white.

EXAMPLE 7

A steel reactor equipped with a stirrer and a heater is charged with 300 g of dodecalactam and 30 g of vanadium pentoxide (10 percent by weight), purged with nitrogen and closed. The reaction is carried on at atmospheric pressure in an atmosphere of nitrogen at a temperature of 300° C. for 3.5 hours with continuous stirring, after which the reactor is cooled down and the product polymer discharged therefrom. The degree of conversion is 98.5%; the molecular weight is about 24,000; and the color of the polymer is black.

EXAMPLE 8

A steel reactor equipped with a stirrer and a heater is charged with 300 g of dodecalactam and 30 g of chromium oxide (10 percent by weight), purged with nitrogen and closed. The reaction is carried on at atmospheric pressure in an atmosphere of nitrogen at a temperature of 300° C. for 5 hours with continuous stirring, after which the reactor is cooled down and the product polymer discharged therefrom. The degree of conversion is 99%; the molecular weight is about 35,000; and the color of the polymer is green.

EXAMPLE 9

A steel reactor equipped with a stirrer and a heater is charged with 280 g of dodecalactam and 15 g of copper oxide (5.35 percent by weight), purged with nitrogen and closed. The reaction is carried on at atmospheric pressure in an atmosphere of nitrogen at a temperature of 300° C. for 6 hours with continuous stirring, after which the reactor is cooled down and the product polymer discharged therefrom. The degree of conversion is 98%; the molecular weight is 25,000; and the color of the polymer is brown.

EXAMPLE 10

A steel reactor equipped with a stirrer and a heater is charged with 300 g of dodecalactam and 30 g of titanium dioxide (10 percent by weight), purged with nitrogen and closed. The reaction is carried on at atmospheric pressure in an atmosphere of nitrogen at a temperature of 300° C. for 2 hours with continuous stirring, after which the reactor is cooled down and the product polymer discharged therefrom. The degree of conversion is 99%; the molecular weight is 38,000; and the color of the polymer is white.

EXAMPLE 11

A steel reactor equipped with a stirrer and a heater is charged with 300 g of dodecalactam and 30 g of titanium dioxide (10 percent by weight), purged with argon to remove all air therefrom and closed. The reaction is carried on at atmospheric pressure in an atmosphere of argon at a temperature of 300° C. for 2 hours with continuous stirring, after which the reactor is cooled down and the product polymer discharged therefrom. The degree of conversion is 98.9%; the molecular weight is 39,000; and the color of the polymer is white.

EXAMPLE 12

A steel reactor equipped with a stirrer and a heater is charged with 200 g of dodecalactam and 10 g of titanium dioxide (5 percent by weight), purged with nitrogen to remove all air therefrom and closed. The reaction is carried on at atmospheric pressure in an atmosphere of nitrogen at a temperature of 300° C. for 4 hours with continuous stirring, after which the reactor is cooled down and the product polymer discharged therefrom. The degree of conversion is 98.5%; the molecular weight is 43,000; and the color of the polymer is white.

EXAMPLE 13

A steel reactor equipped with a stirrer and a heater and having an inlet port made of aluminum foil is charged with 200 g of dodecalactam and 10 g of titanium dioxide (5 percent by weight), purged with nitrogen to remove all air therefrom and closed. The reaction is carried on at atmospheric pressure in an atmosphere of nitrogen at a temperature of 300° C. for 15 minutes, the reaction mixture being exposed to fast electrons of energy 5 MeV, mean current density 1 microamp/sq.cm. and dose rate 200,000 rad/sec. Then the reactor is cooled down and the product polymer discharged therefrom. The degree of conversion is 98%; the molecular weight is 23,000; and the color of the polymer is white.

EXAMPLE 14

An aluminum reactor equipped with a stirrer and a heater is charged with 200 g of dodecalactam and 10 g of titanium dioxide (5 percent by weight), purged with argon to remove all air therefrom and closed. The reaction is carried on at atmospheric pressure in an atmosphere of argon at a temperature of 300° C. for 90 minutes with continuous stirring, the reaction mixture being exposed to X-rays of energy 400 KeV and dose rate 200 rad/sec. Then the reactor is cooled down and the product polymer discharged therefrom. The degree of conversion is 98.5%; the molecular weight is 30,000; and the color of the polymer is green.

EXAMPLE 15

A steel reactor equipped with a stirrer and a heater is charged with 300 g of dodecalactam and 30 g of titanium dioxide (10 percent by weight), purged with nitrogen and closed. The reaction is carried on at atmospheric pressure in an atmosphere of nitrogen at a temperature of 300° C. for 50 minutes with continuous stirring, the reaction mixture being exposed to gamma-radiation from a Co source of dose rate 120 rad/sec. The degree of conversion is 99.2%; the molecular weight is 35,000; and the color of the polymer is white.

EXAMPLE 16

A steel reactor equipped with a stirrer and a heater is charged with 200 g of dodecalactam and 20 g of chromium oxide (10 percent by weight), purged with argon and closed. The reaction is carried on at atmospheric pressure in an atmosphere of argon at a temperature of 320° C. for 45 minutes with continuous stirring, the reaction mixture being exposed to gamma-radiation of dose rate 180 rad/sec. Then the reactor is cooled down and the product polymer discharged. The degree of conversion is 98.5%; the molecular weight is 30,000; and the color of the polymer is white.

EXAMPLE 17

A steel reactor equipped with a stirrer and a heater is charged with 250 g of dodecalactam and 12.5 g of titanium dioxide (5 percent by weight), purged with nitrogen and closed. The reaction is carried on at atmospheric pressure in an atmosphere of nitrogen at a temperature of 300° C. for 90 minutes, the reaction mixture being exposed to gamma-radiation of dose rate 200 rad/sec. Then the reactor is cooled down and the product polymer discharged therefrom. The degree of conversion is 98.7%; the molecular weight is 38,000; and the color of the polymer is white.

EXAMPLE 18

In this example, the process is effected in the same way as in Example 17, except that the reaction is carried out in an atmosphere of air. The reaction time is 1 hour. The degree of conversion is 98.7%; the molecular weight is 35,000; the color of the polymer is white.

The mechanical properties of the polymers manufactured in the process of this invention are illustrated by the following table which shows the properties of the polymer produced from dodecalactam exposed to gamma-rays (Example 17).

TABLE 1

Ultimate tensile stress, 430 to 450 kgf/sq.cm.
Ultimate elongation, 200 to 240%
Yield point in elongation, 400 to 440 kgf/sq.cm.
Notched impact number, 7 to 9 kgf.cm/sq.cm.
Impact number, 85 to 90 kgf.cm/sq.cm.
Brinnel hardness at a load of 13.5 kgf, 495 to 510 kg/sq.cm.
Coefficient of friction, 0,3
Steel gauze wear, $6.10^{-5}$ cu.mm/m.sq.cm.
Inductive capacity, 3.2

Power factor at $10^6$ Hz, 0.027
Electric strength, 23 kv/mm
Specific electrical resistivity, $10^{14}$ ohm.cm.

What we claim is:

1. A process for the production of polyamides, which consists essentially of cationical polymerizing lactams having 6 to 12 carbon atoms in the presence of a transition d-metal oxide selected from the group consisting of $TiO_2$, $V_2O_5$, $Cr_2O_3$, $MnO_2$, CuO, $Cu_2O$, ZnO, $Co_2O_3$, $MoO_3$ and $WO_3$ as catalyst, said catalyst accounting for from 0.1 to 50 percent by weight of the reaction mixture consisting of the lactam and the oxide at a temperature in the range from 200° to 350° C. in an atmosphere of air or an inert gas.

2. A process as claimed in claim 1, in which the polymerization is carried out at a residual pressure of from $10^{-1}$ to $10^{-5}$ torr.

3. A process as claimed in claim 1, in which the polymerization is carried out at atmospheric pressure.

4. A process as claimed in claim 1, in which the polymerization is carried out at a pressure of up to 3 atm.

5. A process as claimed in claim 1, in which the metal oxides account for from 5 to 20 percent by weight of the the reaction mixture.

6. A process as claimed in claim 1, in which the d-metal oxide is $TiO_2$.

7. A process as claimed in claim 1, in which the d-metal oxide is $V_2O_5$.

8. A process as claimed in claim 1, in which the d-metal oxide is $Cr_2O_3$.

9. A process as claimed in claim 1, in which the d-metal oxide is CuO.

10. A process as claimed in claim 1, in which the polymerization of the lactam is effected in an atmosphere of nitrogen.

11. A process as claimed in claim 1, in which the polymerization of the lactam is effected in the presence of argon.

12. A process as claimed in claim 1, in which the polymerization of the lactam is effected in the presence of 5 percent by weight of $TiO_2$ at a temperature of 300° C. in an atmosphere of nitrogen at atmospheric pressure for 4 hours.

13. A process as claimed in claim 1, in which the polymerization of the lactam is effected with the reactants being simultaneously exposed to an ionizing radiation.

14. A process as claimed in claim 13, in which the ionizing radiation is constituted by fast electrons.

15. A process as claimed in claim 13, in which the ionizing radiation is constituted by X-rays.

16. A process as claimed in claim 13, in which the ionizing radiation is constituted by gamma-rays.

17. A process as claimed in claim 13, in which the polymerization of the lactam is effected with the reactants being exposed to an ionizing radiation of a dose rate in the range from 20 to 200,000 rad/sec depending on the kind and level of the oxide, the temperature and the kind of the medium as well as the kind of the ionizing radiation source.

18. A process as claimed in claim 13, in which the polymerization of the lactam is effected in the presence of 5 percent by weight of $TiO_2$ in an atmosphere of nitrogen at atmospheric pressure and a temperature of 300° C. for about 1 hour, with the reactants being exposed to gamma-radiation of dose rate 200 rad/sec.

19. A process as claimed in claim 1 wherein the d-metal oxide is selected from the group consisting of $TiO_2$, $V_2O_5$, and $Cr_2O_3$.

20. A process as claimed in claim 1 wherein the lactam is selected from the group consisting of caprolactam and dodecalactam.

* * * * *